C. J. SHIVER.
Shovel Plow.

No. 28,416. Patented May 22, 1860.

Witnesses:
R. S. Spencer
J. W. Coombs.

Inventor.
C. J. Shivers
per Munn & Co
Attys.

UNITED STATES PATENT OFFICE.

C. J. SHIVER, OF CAMDEN, SOUTH CAROLINA.

IMPROVEMENT IN PLOWS.

Specification forming part of Letters Patent No. 28,416, dated May 22, 1860.

*To all whom it may concern:*

Be it known that I, C. J. SHIVER, of Camden, in the county of Kershaw and State of South Carolina, have invented a new and Improved Plow; and I do hereby declare that the following is a full, clear, and exact description of the same, reference being had to the annexed drawings, making a part of this specification, in which—

Figure 1:
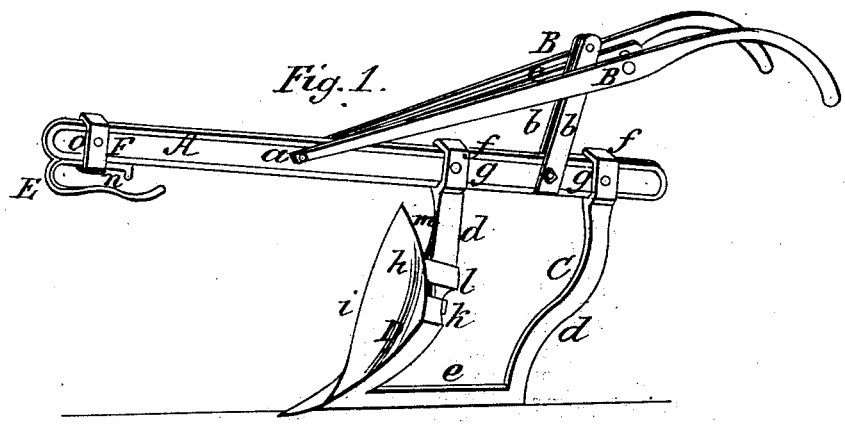
Figure 2:
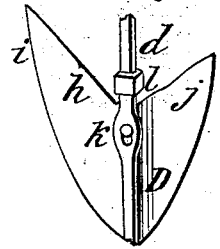
Figure 3:
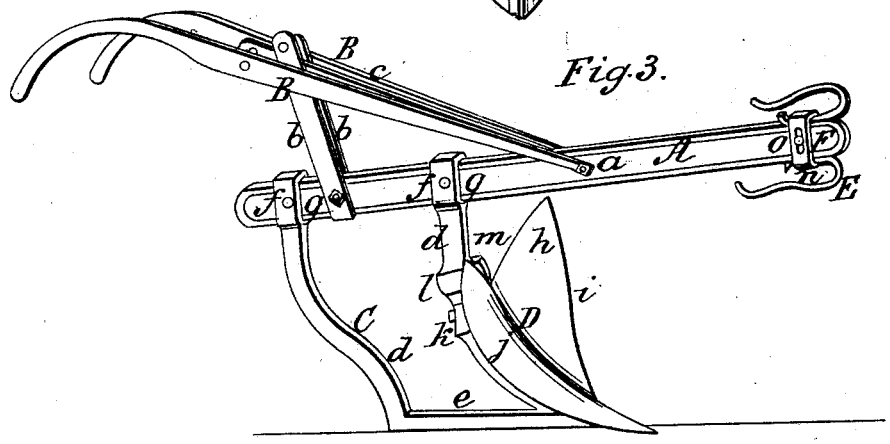

Figure 1 is a perspective view of my invention; Fig. 2, a detached back view of the share; Fig. 3, a perspective view of the whole device, taken at the side opposite to that shown in Fig. 1.

Similar letters of reference indicate corresponding parts in the several figures.

To enable those skilled in the art to fully understand and construct my invention, I will proceed to describe it.

A represents the beam of the plow, to which two handles, B B, are attached at their front ends by a bolt, *a*, and secured at any desired height or angle by a bolt passing through uprights *b*, attached to the beam, and through a central bar, *c*, between the handles. This adjustment of the handles admits of the same being raised or lowered to suit the height of the plowman.

C is an iron frame, which is formed of two upright curved bars, *d d*, connected by a horizontal bar, *e* at their lower ends. At the upper end of each bar *d* there is an eye, *f*, and through these eyes the beam A passes, the eyes being secured to the beam by bolts *g* or otherwise. The frame C is fitted to the back part of the beam, as shown clearly in Figs. 1 and 3.

D represents the share, the lower part of which approximates to a shovel form. At a short distance above the point of the share, however, the sides branch off at different angles, the side *h*, at the left, projecting well upward, forming a prominent cutting-edge, *i*. The other side, *j*, rather recedes back, and has a gradual curve to turn the sod or earth which comes in contact with it, similar to the moldboard of an ordinary turning-plow. The share D is attached to the front bar, *d*, of the frame C, the front bar, *d*, serving as its foot or standard. The share is attached to said upright by having a pin or projection, *k*, at its back fitted in a hole in the front bar, *d*, and having a collar or keeper, *l*, which is on said upright, fitted over a lip, *m*, at the upper end of the share. By this means the share is not only firmly secured to the front bar, *d*, but readily attached to it and detached therefrom.

E represents an iron hook, the back end of which is provided with a head, *n*. This hook is secured to the front end of the beam by a collar or keeper, F, which is fitted on the beam and secured thereto by a screw-bolt, *o*, which passes through oblong slots in the sides of the collar or keeper and through the beam. This hook and collar or keeper form an adjustable clevis, as the hook E may be adjusted either above or below the beam, or at either side, two adjustments being allowed at each side, one above and the other below the screw-bolt *o*. Thus the hook may be adjusted in six different positions, as occasion may require, and by an exceedingly simple means.

By having the share D of the form as described the plow at the side *h* may be made to cut or share the beds or drills to the desired width, and cut all grass and sod between. By using the other side, *j*, the earth may be turned or cast toward the plants. The frame C renders the plow very stiff, and the bottom bar, *e*, prevents any lateral movement of the plow in the earth.

I do not claim the adjustable handles B, for they have been previously used; but I do claim as new and desire to secure by Letters Patent—

The arrangement of the double curved frame C, horizontal bar *e*, bars *d d*, eyes *f f*, beam A, and share D, as and for the purposes herein shown and described.

C. J. SHIVER.

Witnesses:
WM. M. BALLOCK,
J. G. EVANS.